United States Patent [19]
Urbas

[11] 3,751,974
[45] Aug. 14, 1973

[54] TURBULENT FLOW HIGH-MOLECULAR LIQUID VISCOSIMETER

[75] Inventor: Wolfgang Dietrich Urbas, Krefeld, Germany

[73] Assignee: Deutsche Texaco Aktiengesellschaft, Hamburg, Germany

[22] Filed: Oct. 7, 1971

[21] Appl. No.: 187,343

[30] Foreign Application Priority Data
Oct. 9, 1970   Germany.................. P 20 49 672.4

[52] U.S. Cl. .................................................. 73/54
[51] Int. Cl. ........................................... G01n 11/10
[58] Field of Search....................... 73/54, 59, 32 A; 137/92

[56] References Cited
UNITED STATES PATENTS
3,455,145   7/1969   Gustafsson............................ 73/59
3,525,252   8/1970   Kocatas ................................. 73/54

Primary Examiner—Richard C. Queisser
Assistant Examiner—Joseph W. Roskos
Attorney—Thomas H. Whaley et al.

[57] ABSTRACT

A device for continuously measuring the viscosity of high-molecular liquids in turbulent flow comprises a vibrating reed on a viscosimeter mounted in a tube opening into an agitating cylindrical vessel with the free end of the vibrating reed pointing upstream and positioned a distance from the flowing liquid equal to three times the diameter of the tube. The face of the reed is substantially parallel to a plane including a typical arcuate line of flow at the opening, and the tube containing the reed is mounted with its longitudinal axis at an angle between 5° and 15° below a plane of a typical arcuate line of flow at the tube opening. The tube longitudinal axis of one embodiment is mounted at an angle of between 25° and 35° outwardly from a plane tangent to the lines of flow at the tube opening and a modification has the vibrating reed mounted in two tubes and spaced from the opening a distance of three tube diameters. Both embodiments prevent gas cushion build up around the vibrating reed and the attendant inaccurate measurement in a reaction producing higher molecular materials under azeotrope-forming conditions.

21 Claims, 4 Drawing Figures

PATENTED AUG 14 1973

TURBULENT FLOW HIGH-MOLECULAR LIQUID VISCOSIMETER

DESCRIPTION OF THE PRIOR ART

Measurement of the viscosity of liquids in a static state or in laminar flow, using a viscosimeter with a vibrating reed is known and has been described by the Hartmann and Braun Aktiengesellschaft, Frankfurt/M., in its catalog "Bendix-Ultra-Viscoson," H u. B-Dr. 917, May 1955, and by Dr. Kleinschmidt in his paper published in the journal "Farbe und Lack," vol. 74, pp 976–984 (1968).

German Auslegeschrift No. 1,598,576 discloses a device which, it is claimed, may be used for the continuous measurement of the viscosity of liquids even though their flow is turbulent. In practical application, however, this device which is quite different, has the following deficiencies:

1. It is complicated and expensive to design.
2. Installing the device in an agitated vessel is difficult, particularly in one equipped with heating or cooling coils.
3. There is a tendency to clog.
4. Inaccurate or incorrect values result due to the gas cushion build up around the vibrating reed, which occurs frequently, for example, when the unit is run under azeotrope-forming conditions or when inert gas is passed through the reaction material.

The present invention overcomes these disadvantages as shown hereinafter.

OBJECTS OF THE INVENTION

A principal object of this invention is to provide a viscosimeter which provides measured data that can be reproduced with such accuracy that it may be used for determining the end of a reaction, even when obtained in azeotrope-forming operations or during the passage of inert gas through the reaction material; another object of this invention is to provide a simple and inexpensive design; a further object of this invention is to provide a viscosimeter that is easy to install in any type of agitating vessel; and a still further object of this invention is to provide a viscosimeter that is not conducive to clogging.

Other objects and various advantages of the disclosed turbulent flow high-molecular liquid viscosimeter will be apparent from the following detailed description, together with the accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example not by way of limitation, two forms of the invention wherein like reference numbers have been employed to indicate similar parts.

The invention disclosed herein the scope of which being defined in the appended claims is not limited in its application to the details of construction and arrangement of parts shown and described, since the invention is capable of other embodiments and of being practiced or carried out in various other ways. Also it is to be understood that the phraseology or terminology employed herein is for the purpose of description and not of limitation.

DESCRIPTION OF THE PREFERRED EMBODIMENTS OF THE INVENTION

The present invention relates to a viscosimeter with a vibrating reed for continuously measuring the viscosity of liquids in turbulent flow.

In the manufacture of high-molecular liquids in turbulent flow as in connection with the manufacture of resins in general and phenol resins in particular, it has been difficult to follow up and control the course of the reaction and, possibly, terminate it upon reaching the desired viscosity, or to aid the continuous viscosity measurements.

Figure 1:
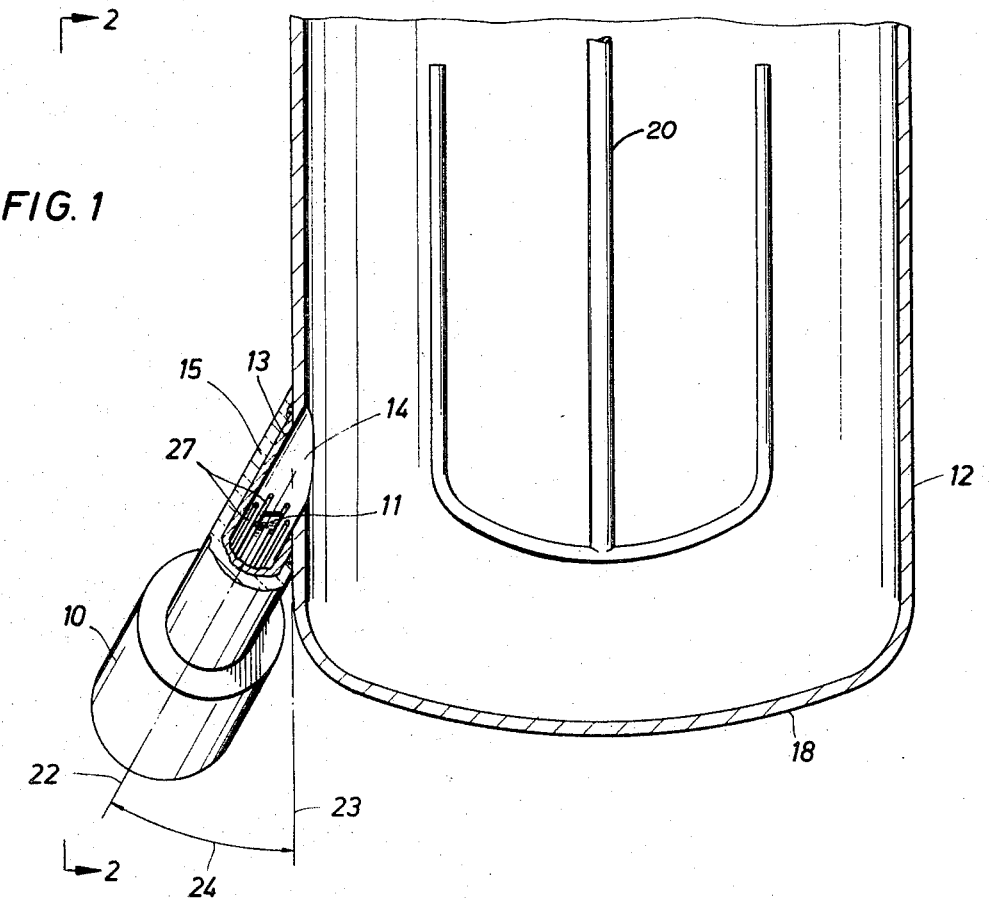
FIG. 1 is a schematic elevation of the viscosimeter with parts in sections.
Figure 2:
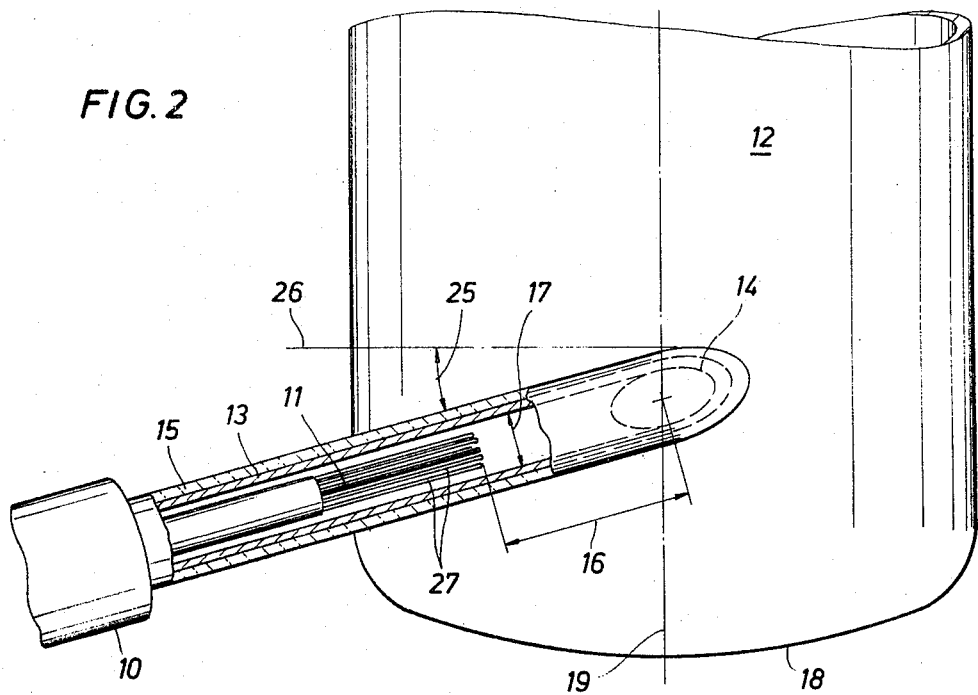
FIG. 2 is a schematic view taken at 2—2 on FIG. 1 with parts in section.

The new viscosimeter measuring device comprises a viscosimeter 10, FIGS. 1 and 2, and a vibrating reed 11 for continuously measuring the viscosity of liquids in a turbulent flow in an agitating vessel 12 mounted in a well insulated tube 13. This tube is mounted on the agitating vessel 12 over an opening 14 in the vessel wherein the moving liquid flows into and out of the tube holding the vibrating reed. The insulation 15 around the tube 13 maintains the temperature of the liquid in the tube constant as it circulates from the vessel 14 into the tube and back out again. This particular mounting prevents gas cushion build up and produces accurate measurements. The tube is mounted with the free end of the vibrating reed 11 spaced from the opening 14 in the vessel wall by a distance 16, FIG. 2, equal to 1 to 5 times the diameter 17 of the tube. Preferably, and best results occur with this distance 16 being 3 times the tube diameter. An actual embodiment of the invention has a tube diameter of 25 mm and spaced at a distance of 75 mm from the hole in the wall of the vessel. Likewise, the angle of the tube mounting on the vessel wall relative to the direction of flow is critical and important. The tube 13, as illustrated in FIG. 2, is positioned to point substantially in a direction up stream. If the reaction leading to higher-molecular materials is conducted under azeotrope-forming conditions or if inert gas is passed through the reaction material, it is desired to prevent any gas cushion buildup around the vibrating reed in the tube which results in inaccurate measurements. To prevent this build up of gas cushions, a precise mounting of the tube on the agitating vessel is required.

The disclosed and exemplary vessel 12, FIG. 1, is cylindrical in shape and is shown standing on one of its circular ends 18 with its longitudinal axis 19, FIG. 2, being vertical. An impeller 20, FIG. 1, rotates about this vertical longitudinal axis to rotate the liquid therein clockwise, for example, when viewed from above, as illustrated by a typical line of flow 21 of the fluid in FIG. 4.

The tube 13, FIG. 1, with a viscosimeter 10 mounted on its outer end has its inner end mounted on the side of the vessel 12 over the opening 14 therein adjacent the lower end of the vessel. The longitudinal axis 22, FIG. 1, of the free end of the tube 13 is tilted outwardly from a vertical plane 23 tangent to a line of flow of the liquid at the opening by an angle 24 of 0° to 45°.

Broadly, tube 13 may be defined as having its longitudinal axis positioned at an angle between 0° and 45° outwardly from a plane normal to the plane of the arcuate line of flow at the opening. The best angular range is from 25° to 35° between the longitudinal axis 22 of the tube and the plane 23 tangent to the lines of flow or the vertical side of the vessel 12 in this case. An angle 24 of 30° is preferred.

Likewise, a second angle 25, FIG. 2, is critical in the mounting of the tube 13 with the viscosimeter 10 therein on the vessel. This angle 25, is that angle formed between the tube 13 or its longitudinal axis and a plane 26 containing an arcuate flow line at the opening as the horizontal plane in FIG. 2. Angle 25 should be in the range of 0° to 30° and preferably a range of 5° to 15°. It is preferred that angle 25 be 10°. It has been found that these angles provide the greatest amount of escape of gas upwardly out of the tube and its vibrating reed.

FIG. 1 and 2 illustrate further a basket shield formed of bars 27 completely surrounding the reed 11. This basket shield protects the vibrating reed 11 from foreign material in the circulating liquid. The tube 13 may be mounted on the vessel 12 as by welding or with flanges or being screwed onto the vessel. Here the viscosimeter 10 is mounted at the free end of the tube 13 containing the vibrating reed 11 with the tube angled substantially in a direction against the current or direction of flow at the wall opening 14 where the tube connects with the vessel of flowing liquid.

Figure 3:
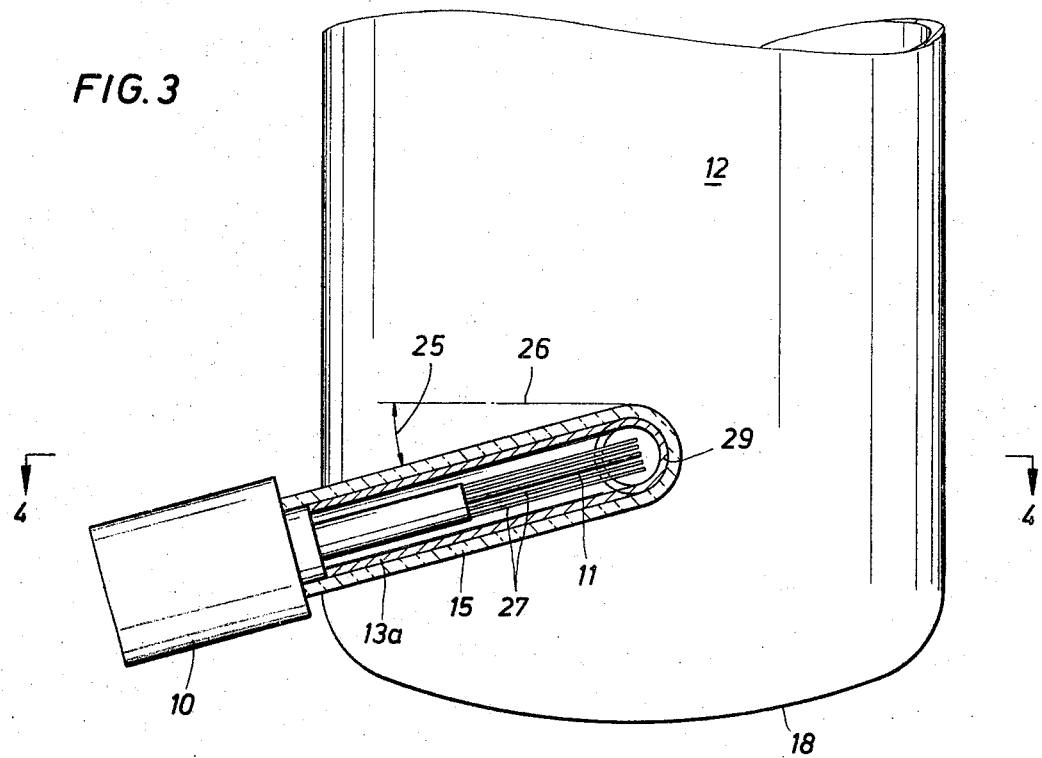
FIG. 3 is a schematic elevation of a modification of the viscosimeter of FIG. 1 with parts in section.
Figure 4:
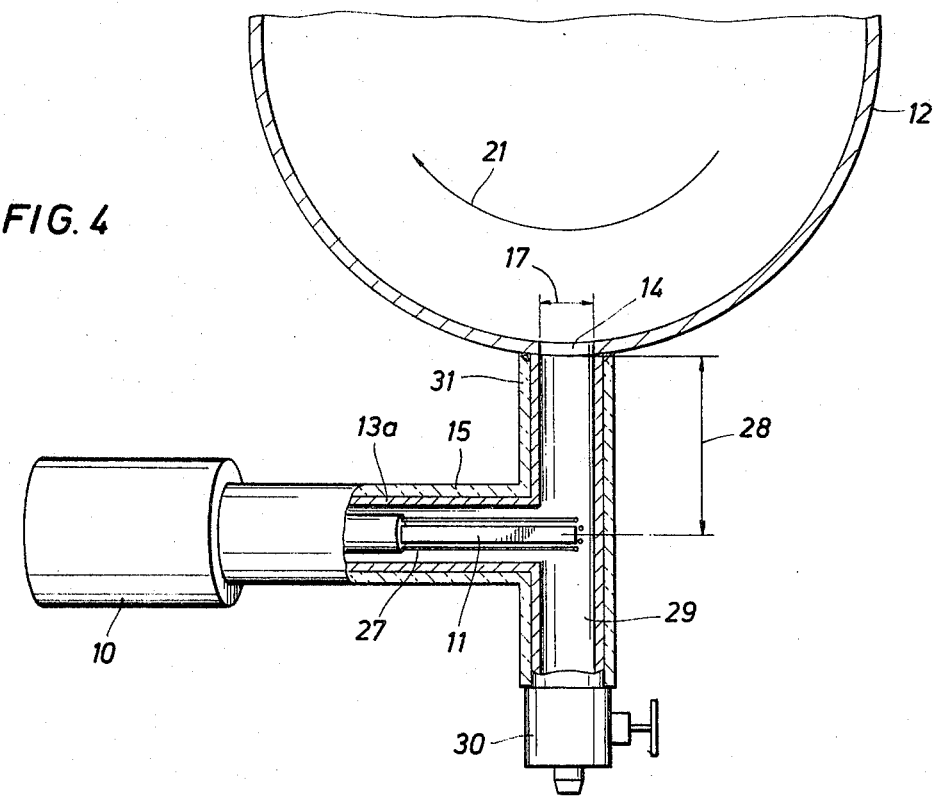
FIG. 4 is a schematic horizontal section at 4—4 on FIG. 3.

FIG. 3 is an elevation of the modified viscosimeter measuring device and FIG. 4 is a horizontal section therethrough. The viscosimeter 10 and its tube 13 are laterally offset from the vessel by a predetermined distance 28, as illustrated in the sectional view of FIG. 4. Here the tube 13 is connected to a second or transverse tube 29 intermediate the ends thereof. This transverse tube 29 is also well insulated.

The outer end of the transverse tube 29 is closed with a valve 30 for inspection of the end of the vibrating tube and the transverse tube to see or monitor that mass transferring is continuous. The inner end of the second or transverse tube is mounted over the opening 14 in the vessel wall by any convenient and suitable method, such as but not limited to, welding.

Transverse tube 29, FIG. 4, extends outwardly from the opening 14 and normal to a line tangent to the typical arcuate line of flow 21 at the opening in the plane of the arcuate line.

Tube 13 is connected to transverse tube 29 by any suitable means, as by welding.

A suitable insulation blanket 31, similar to insulation 15 around tube 13, is wrapped around transverse tube 29 to insure that the temperature does not vary or drop any significant amount in the liquid as it circulates from the vessel 12 into both tubes 13 and 29 and back into the vessel.

In FIG. 3 with the fluid flowing in a horizontal plane 26 from right to left past the opening, the tube 13 is positioned to face upstream so that its longitudinal axis intersects the horizontal plane or the plane including the arcuate line of flow at the tube opening at an angle in the range of 0° to 30°. The preferable angle has been found to be in the range of 5° to 15°, and 10° is the best angle.

FIG. 4 illustrates the distance 28 which the vibrating reed 11 in the tube 13 must be positioned on the second transverse tube. This distance of the vibrating reed 11 from the opening 14 is required to be substantially three times the inside diameter of the tube 13 containing the vibrating reed 11. In actual practice the tube may be 25 mm in diameter and positioned on the transverse tube such that the reed is 75 mm from the opening 14 in the vessel 12. Also, the plane or face of the reed 11, FIG. 4, is parallel to a plane through the longitudinal axis of the transverse tube 29 and the longitudinal axis of the tube 13. This plane of the face of the reed is substantially parallel to the plane of the arcuate line of flow of liquid in the vessel at the opening.

With production of high-molecular materials by polycondensation, polyermization, or polyaddition, insoluble particles are formed which falsify the measured data. This inaccurate data is obviated by mounting the basket shield 27, FIGS. 3 and 4, around the vibrating reed 11. This basket shield may assume a variety of shapes to be adapted to the specific requirements. Preferably, the basket shield consists of bars 27 projecting from the viscosimeter 10 and arranged in parallel relationship with each other and with the vibrating reed 11, leaving the basket shield open at the free end of the reed. This reed free end protrudes well past the center of transverse tube 29.

Very reliable viscosity data of liquids in turbulent flow has resulted from the disclosed viscosimeters. It is deemed that the tubes produce excellent reproducable data by providing conditions of (1) laminar flow, (2) complete mass transfer, and (3) practically no difference between temperatures of the liquids in the agitating vessel and in the tubes. Accordingly, the disclosed viscosimeter is (1) simple and of inexpensive design; (2) easy to be installed in any type of agitating vessel; (3) void of clogging therein; and (4) the measured data resulting from both modifications of the disclosed viscosimeter can be reproduced with such accuracy that they may be used for determining the end of the reaction, even when obtained in azeotrope-forming operations or during the passage of inert gas through the reaction material.

While only two embodiments of the invention have been disclosed in the accompanying specification and drawings, it will be evident that various other modifications are possible in the arrangement and construction of the disclosed turbulent flow high-molecular liquid viscosimeter without departing from the scope of the invention, and it is accordingly desired to comprehend within the purview of this invention such modifications as may be considered to fall within the scope of the appended claims.

We claim:

1. A device for continuously measuring the viscosity of liquid in turbulent flow in an agitating vessel having an opening for communicating with the liquid comprising,
   a. tube means for receiving turbulent liquid flow from the opening in said vessel,
   b. said tube means being mounted to said vessel over the opening with the longitudinal axis of said tube means being pointed upstream at an angle of substantially less than 90° with the direction of said turbulent liquid flow,
   c. viscosimeter means for said tube means,
   d. vibrating reed means for said viscosimeter means in said tube means, and e. said vibrating reed means having a free end, said free end being spaced a predetermined distance from said vessel opening for receiving said turbulent liquid flow.

2. A device for continuously measuring the viscosity of liquid in turbulent flow in an agitating vessel having an opening for communicating with the liquid comprising,
   a. a tube, one end of said tube being connected to the vessel over the opening,
   b. a viscosimeter connected to the other end of said tube,
   c. a vibrating reed in said tube connected to said viscosimeter,
   d. said vibrating reed having a free end, said free end being spaced a predetermined distance from said vessel opening for receiving said turbulent liquid flow, and
   e. said vibrating reed being pointed upstream of the turbulent flow for preventing any gas cushion buildup therearound.

3. A device as recited in claim 1 wherein,
   a. said predetermined distance is between 1 and 5 times the diameter of the tube means.

4. A device as recited in claim 1 wherein,
   a. said predetermined distance is 3 times the diameter of the tube means.

5. A device as recited in claim 1 wherein the turbulent flow of liquid past the opening has a typical arcuate line of flow and wherein,
   a. said vibrating reed means is pointed upstream of the turbulent flow at an angle of substantially less than 90° with the direction of said turbulent liquid flow for preventing any gas cushion buildup therearound, and
   b. the reed means has a flat face, said face being substantially parallel to a plane including said typical arcuate line of flow.

6. A device as recited in claim 1 wherein the turbulent flow of liquid past the opening has a typical arcuate line of flow,
   a. the tube means is mounted to the vessel over the opening with the longitudinal axis of the tube means being at an angle between 0° and 30° below a plane of said typical arcuate line of flow at the opening.

7. A device as recited in claim 6 wherein
   a. the angle is between 5° and 15°.

8. A device as recited in claim 6 wherein,
   a. the angle is 10°.

9. A device as recited in claim 1 wherein,
   a. the vibrating reed means has basket shield means therearound for maintaining the vibrating reed means free of foreign material.

10. A device as recited in claim 9 wherein,
    a. the basket shield means comprises a plurality of parallel bars mounted in the tube means and encircling the vibrating reed means.

11. A device as recited in claim 1 wherein the turbulent flow of liquid has a typical arcuate line of flow at the opening and wherein,
    a. the tube means is mounted on the vessel over the opening with the longitudinal axis of the tube means being at an angle between 0° and 45° outwardly from a plane normal to the plane of the arcuate line of flow at the opening.

12. A device as recited in claim 11 wherein,
    a. the angle is between 25° and 35°.

13. A device as recited in claim 11 wherein,
    a. the angle is 30°.

14. A device as recited in claim 1 wherein the turbulent flow of liquid has a typical arcuate line of flow at the opening and wherein,
    a. the tube means includes first and second tubes, the longitudinal axis of said first tube extends outwardly from the opening normal to a line tangent to said typical arcuate line of flow at the opening in the plane of said arcuate line,
    b. said second tube is connected to said first tube intermediate the ends thereof, and
    c. said vibrating reed means has a reed fixed at one end in said second tube with the other end of said reed protruding from said second tube well past the center of said first tube.

15. A device as recited in claim 14 wherein,
    a. the end of the reed protrudes into the first tube at a predetermined distance from the opening, and
    b. said predetermined distance is equal to 3 times the diameter of said second tube containing the vibrating reed.

16. A device as recited in claim 14 wherein,
    a. a valve is positioned at the outer end of the first tube for monitoring of mass transfer therein.

17. A device as recited in claim 14 wherein,
    a. both of the first and second tubes are well insulated to insure an insignificant drop in temperature of the turbulent liquid upon circulation from the vessel through the tubes.

18. A device as recited in claim 14 wherein,
    a. the second tube is mounted on the first tube so that the vibrating reed in the second tube points in a direction that is upstream of the turbulent liquid flow.

19. A device as recited in claim 14 wherein,
    a. the second tube is mounted on the first tube with the longitudinal axis of the second tube being at an angle between 0° and 30° below a plane of the typical arcuate line of flow at the opening.

20. A device as recited in claim 19 wherein,
    a. the angle is between 5° and 15°.

21. A device as recited in claim 19 wherein,
    a. the angle is 10°.

* * * * *